No. 631,790. Patented Aug. 29, 1899.
W. R. GRIFFIN.
ANIMAL TRAP.
(Application filed June 29, 1899.)
(No Model.)
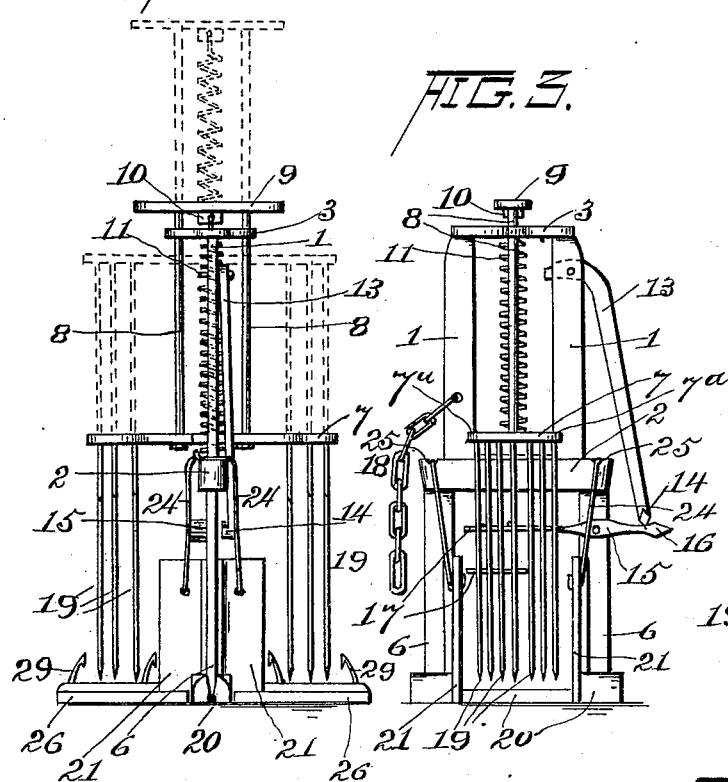
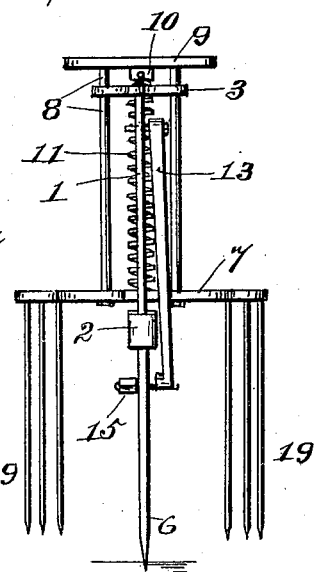
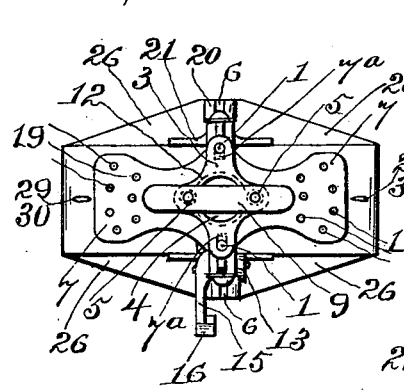
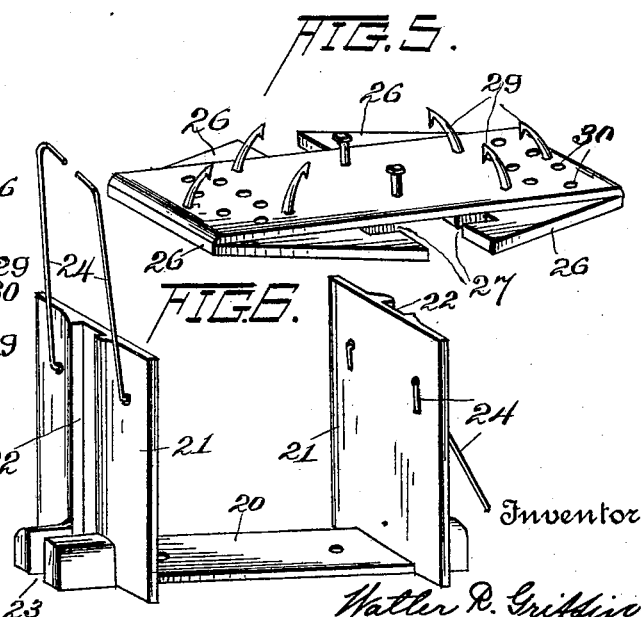
Witnesses
Sam R. Turner
Joseph F. Kelly.
Inventor
Walter R. Griffin
By C. A. Belt Attorney
THE NORRIS PETERS CO., PHOTO-LITHO., WASHINGTON, D. C.

UNITED STATES PATENT OFFICE.

WALTER R. GRIFFIN, OF BIVINS, TEXAS.

ANIMAL-TRAP.

SPECIFICATION forming part of Letters Patent No. 631,790, dated August 29, 1899.

Application filed June 29, 1899. Serial No. 722,282. (No model.)

*To all whom it may concern:*

Be it known that I, WALTER R. GRIFFIN, a citizen of the United States, residing at Bivins, in the county of Cass and State of Texas, have invented certain new and useful Improvements in Animal-Traps, of which the following is a specification.

This invention relates to fishing and trapping and particularly to animal traps.

The object of the invention is to provide an impalement animal-trap of novel and peculiar construction of parts whereby animals underground or in water may be caught quite as expeditiously as animals which travel over the surface of the ground.

The invention consists in the novel construction and arrangement of parts and resides, essentially, in combining an underground or water animal-trap with an overground animal-trap and a double impalement means for the latter form of trap.

In the accompanying drawings, forming part of this application, Figure 1 is a side elevation showing the trap thrown and in dotted lines set for overground animals. Fig. 2 is a top view of the trap as shown in Fig. 1. Fig. 3 is a front view with the speared or impalement bottom removed. Fig. 4 is a side elevation of the trap arranged for catching moles or underground animals. Fig. 5 is a perspective view of the speared bottom. Fig. 6 is a perspective view of the removable base.

The same numeral references denote the same parts throughout the several figures of the drawings.

The frame of the trap consists of uprights 1, joined at the bottom by a cross-piece 2, and at their top they are joined by a yoke 3, having a central opening 4 and small holes 5. Depending from the cross-piece 2 are pointed legs 6. A plate 7, having side edge notches 7ª fitting the uprights 1, two arms 8, secured at one end to the said plate, passed through the holes 5, and connected together at their other end by a bar 9, having a depending lug 10, to which one end of a spiral spring 11 is attached, said spring extending through the opening 4, down between the arms 8, and through the opening 12 in the center of the plate 7, where its other end is secured to the cross-piece 2. Each end of the plate 7 has a series of depending spears 19. One arm 13 of a trigger is pivoted to one of the uprights 1 and has a diamond-shaped head 14. The other arm 15 of the trigger is pivoted to one of the legs 6 and has a like head 16 and a bait-carrier 17. A chain 18 is attached to the other of the uprights to secure the trap. In this form or with this much of the device the trap is used for catching moles. It is set by raising the plate 7 above the pivot-point of the trigger-arm 13, and while the said plate rests upon the pivot end of the said arm the diamond head of the latter is made to engage the head of the other trigger-arm 15, the bait-carrier being removed and the legs inserted into the ground until the inner end of the arm 15 touches the surface of the mole-road, so that the mole will raise the ground and thereby throw the trap, causing the spears to enter the earth and impale the mole.

For supporting the trap upon the ground for overground animals I provide a base, which consists of a ground-surface piece 20, having plates 21 separable therefrom, provided with vertical grooves 22 and secured to the piece 20, the latter having slots 23 in each end, which register with the grooves 22 and which, with the said grooves, receive the legs 6. The plates 21 have hook-rods 24, which engage grooves 25 in the cross-piece 2 for connecting the said base to the trap-frame. The trap, with or without this base, may be employed to catch water-animals. Where large animals or fowls are to be trapped, I provide the aforesaid base with a bottom, which consists of a board having end wings 26, with an interval or space between them to accommodate the ground-piece 20 of the base. The inner edges of the wings 26 have slots 27 to receive the edges of the plates 21, the said bottom being detachably secured to the base by bolts 28. The upper surface of the bottom has upwardly-projecting bent barbed spikes 29. Perforations 30 are made through the board for the ends of the spears 19.

I do not wish to limit myself to any particular size or material in the construction of the trap nor to the number of parts comprising the same, but reserve to myself the right to use such material as may be found best adapted to make the trap of any desired size and with a greater or less number of parts, as may be found best in the practical application of the trap, without departing from the spirit of my invention.

Having thus described my invention, what I claim as new, and desire to secure by Letters Patent, is—

1. The combination, with the frame having a trigger, and the spring-controlled vertically-slidable plate having impalement-spears, of a base comprising a ground-piece having slotted ends, plates secured to said ends and having vertical grooves in which and the slots of the said ends the legs of the said frame fit, and the hook-rods for connecting the base to the frame, as set forth.

2. In an animal-trap, the combination with the frame, and the base detachably secured to the frame, of the perforated bottom detachably secured to the base independent of the said frame and having barbed spikes, and wings with an interval or space between them, the inner edge of the wings having slots which with the said space receive the said base, and means for securing the bottom to the base, as set forth.

In witness whereof I hereunto set my hand in the presence of two witnesses.

WALTER R. GRIFFIN.

Witnesses:
E. A. ALLDAY,
H. A. O'NEAL.